April 7, 1931.   G. F. LAMPEN   1,799,592
AGRICULTURAL IMPLEMENT
Filed June 5, 1929
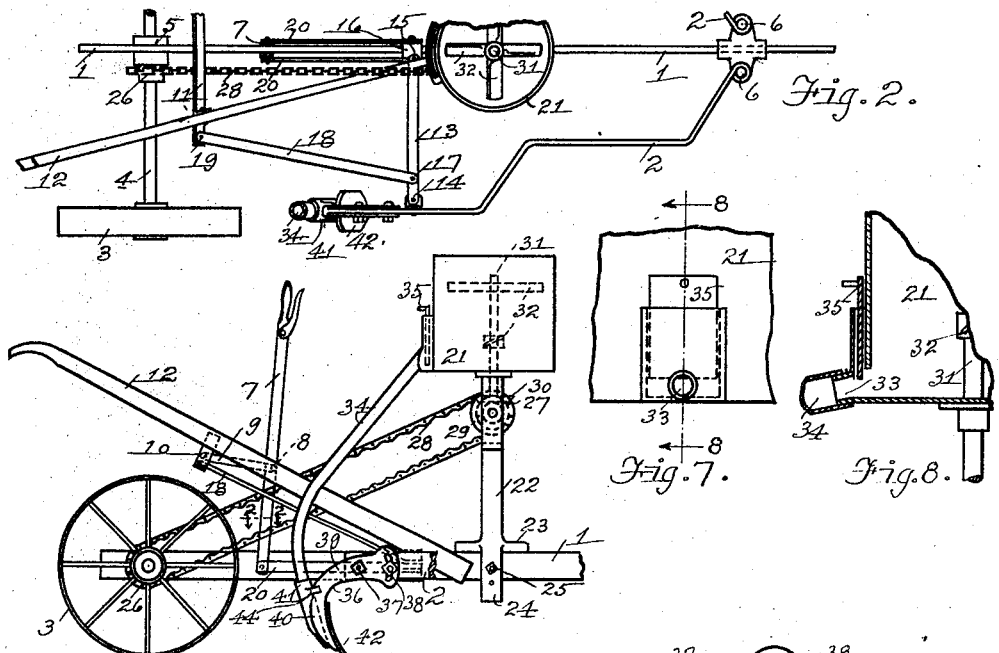
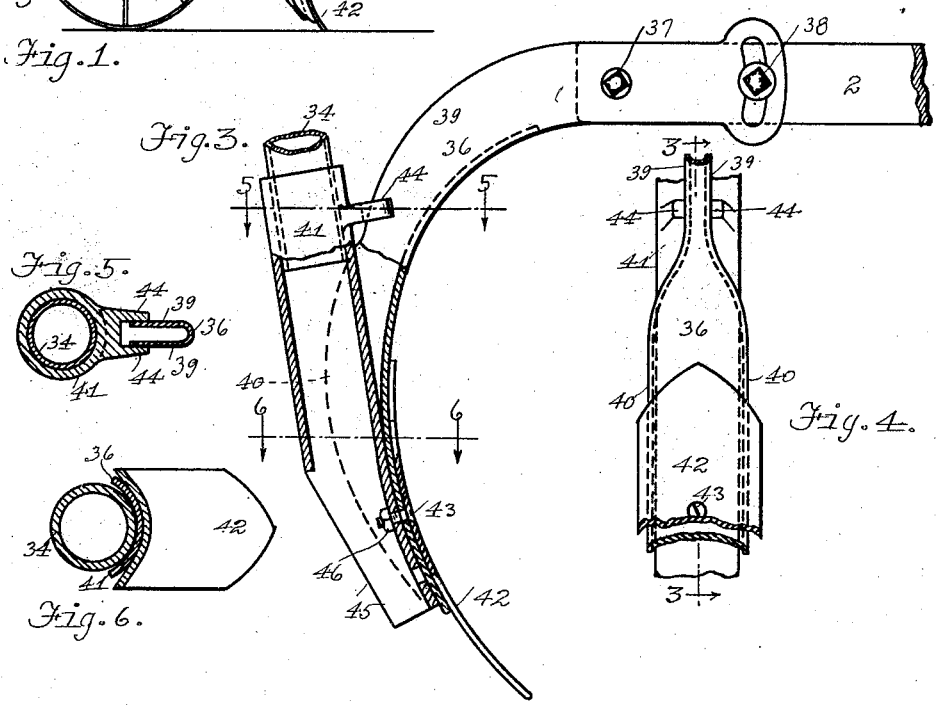
Witness
Geo. L. Chapel
INVENTOR
George F. Lampen
BY
Cyrus W. Rice
ATTORNEY Patented Apr. 7, 1931

1,799,592

UNITED STATES PATENT OFFICE

GEORGE F. LAMPEN, OF HOLLAND TOWNSHIP, OTTAWA COUNTY, MICHIGAN

AGRICULTURAL IMPLEMENT

Application filed June 5, 1929. Serial No. 368,537.

The present invention relates to agricultural implements, particularly seeding and fertilizer-spreading implements; and its object is, generally, to provide such an implement improved in respects hereinafter appearing; and more particularly, to provide seeding and spreading mechanism which may be readily applied to cultivating implements of usual type.

This and any other and more specific objects hereinafter appearing are attained by, and the invention finds preferable embodiment in, the agricultural implement hereinafter particularly described in the body of this specification and illustrated by the accompanying drawings, in which:—

Figure 1 is a side view of the rear portion of an agricultural implement to which my invention is applied;

Figure 2 is a top plan view of the right-hand side thereof, an operating lever of the same being shown in cross-section taken on line 2—2 of Figure 1;

Figure 3 is a side view of certain parts of the same partially sectioned vertically on line 3—3 of Figure 4;

Figure 4 is a front view of said parts, their lower ends being partially broken away;

Figure 5 is a cross-sectional view of some of said parts taken on line 5—5 of Figure 3;

Figure 6 is a cross sectional view thereof taken on line 6—6 of Figure 3;

Figure 7 is a fragmentary rear view of the hopper or magazine for the seed or fertilizer; and Figure 8 is a fragmentary vertical sectional view thereof taken on line 8—8 of Figure 7.

The implement illustrated by these drawings comprises a frame comprising a longitudinal middle bar 1 and longitudinal side bars 2 (only the right hand side bar being completely shown). This frame travels on rear wheels 3 on the axle 4 journalled at suitable points on the frame, as at 5 on the middle bar, the front of the frame being supported in any suitable manner as by a wheel or runner (not shown). Each side bar 2 is connected at its forward end to the middle bar pivotally at 6 and may be swung about said pivot toward or away from the middle bar as by a hand lever 7 fulcrumed at 8 on a link 9 pivoted at 10 on a cross bar 11 extending between the plow handles 12 of the implement. A link 13 pivotally connected at 14 to the side bar 2 and at 15 to a slide 16 on the middle bar is also pivotally connected at 17 to a link 18 whose rear end is pivoted at 19 on the cross bar 11. The lower end of the hand lever 7 is connected by links 20 to the slide 16, so that this hand lever may be swung to move the side bars 2 toward and away from each other, to narrow or widen the field of the implement's operation. A hopper or magazine 21 for the seed or fertilizer to be spread on the ground is carried on the post 22 having an extended foot 23 resting on the upper edge of the middle bar 1 and a bifurcated lower end 24 straddling said middle bar, and clamped thereon by a bolt 25. The axle 4 has a sprocket wheel 26 on which and on the sprocket wheel 27 is carried a chain 28, the shaft of wheel 27 having a bevel gear 29 meshing with a bevel gear 30 on the vertical shaft 31 extending upwardly into the hopper and carrying arms 32, so that the travel of the implement over the ground will, by means of said sprocket wheels and chain and said arms 32, stir the seed or fertilizer in the hopper and urge the same through a vent 33 and thence through the flexible tube 34. The vent 33 is provided with a slidable closure 35 for totally or partially closing the same.

So far, an implement of well-known type has been described. My improvement thereupon, or my improved structure and mechanism adapted to be applied thereto, will now be described.

The side bar 2 carries a downwardly extending arm 36 pivoted at 37 thereto and adjustable as to depth of engagement in the soil by a set screw 38. This arm is U-shaped in cross section having opposite lateral sides 39, which at their upper ends straddle the side bar 2, and which in their lower portions 40 separate farther from each other, forming a hollow arm which receives the metallic lower portion 41 of a tubular conduit from the hopper, the upper portion being the flexible tube 34.

The arm 36 carries at its front side a shovel or cultivating plow 42 of usual form, a threaded bolt 43 passing through registering openings in the shovel, the arm and the conduit portion 41, and having at its rear end the nut 46 so that these parts—the shovel 42, the arm 36 and conduit portion 41—may be readily and securely but detachably fastened together in assembled relation. The conduit portion 41 has adjacent its upper end a pair of spaced lugs 44 engaging and embracing the opposite lateral sides 39 of the arm 36 adjacent their upper ends, i. e., above the point where they separate sufficiently to receive the conduit portion 41. It will be seen that these lugs by their said engagement prevent any rocking of said conduit portion about the bolt 43. This conduit portion is open at its rear and adjacent its lower end, as shown at 45 so that access may be readily had to the nut 46 of the connecting bolt 43.

The invention being intended to be pointed out in the claims, is not to be limited to or by details of construction of the particular embodiment thereof illustrated by the drawings or hereinbefore described.

I claim:—

1. In an implement of the character described, a frame including a horizontal bar, an arm U-shaped in cross section and having its lateral sides spaced apart to a greater extent at the lower portion thereof than at the upper portion of the same, the upper portion of the U-shaped arm snugly embracing and being secured to said horizontal bar, a conduit extending downwardly in the arm between the greater spaced lateral sides thereof and having spaced lugs engaging the sides of the arm at the upper lesser spaced portion of the latter, a shovel at the front of the arm, a bolt extending from the shovel and through the arm and the conduit for detachably connecting said three elements together, the conduit being open at its rear side adjacent its lower end to afford ready access to said bolt.

2. In an implement of the character described, a frame comprising a horizontal bar, an arm U-shaped in cross section and having its opposite lateral sides secured to and embracing at their upper ends said bar between them, a conduit at the rear of said arm extending downwardly in the arm between its said sides, a shovel at the front of the arm, and a bolt extending from the shovel and through the arm and conduit and detachably connecting the same together, the conduit being open at its rear side adjacent its lower end to afford ready access to said bolt, the upper end of the conduit being spaced from said arm and at its upper end being provided with spaced lugs which bridge the space between the conduit and the arm and which embrace the arm adjacent its upper end to prevent accidental rocking of the conduit about said bolt.

In testimony whereof I have hereunto set my hand at Grand Rapids, Michigan, this 1st day of June, 1929.

GEORGE F. LAMPEN.